July 26, 1932.  F. C. FRANK  1,868,740
BRAKE DRUM
Filed June 16, 1930

INVENTOR.
FREDRICK C. FRANK
BY
M. W. McConkey
ATTORNEY

Patented July 26, 1932

1,868,740

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

BRAKE DRUM

Application filed June 16, 1930. Serial No. 461,340.

This invention relates to brake drums and more particularly to liners therefor.

Heretofore, brake drums have been equipped with liners shrunk or otherwise secured on the braking surface of the drum. Such liners as are now in general use have not proved entirely satisfactory due to becoming loose and slipping upon application of the braking or friction element. It has been found that in instances where the liner is secured in positions with screws, the frictional resistance between the liner and the friction element imposes an excessive strain on the screw resulting in the shearing thereof. It is the aim of the present invention to overcome these difficulties.

An object of the invention is to provide an efficient means for securing a liner to a brake drum.

Another object of the invention is to provide a liner for a brake drum having means for preventing relative rotation between the liner and the drum.

A further object of the invention is to provide a liner for a brake drum having means associated with the attaching means thereof adapted to eliminate stresses and strains which may be imposed upon the attaching means upon application of the friction element of the brake.

Other objects of the invention will appear from the following description taken in connection with the drawing which forms a part of this specification, and in which.

Figure 1:
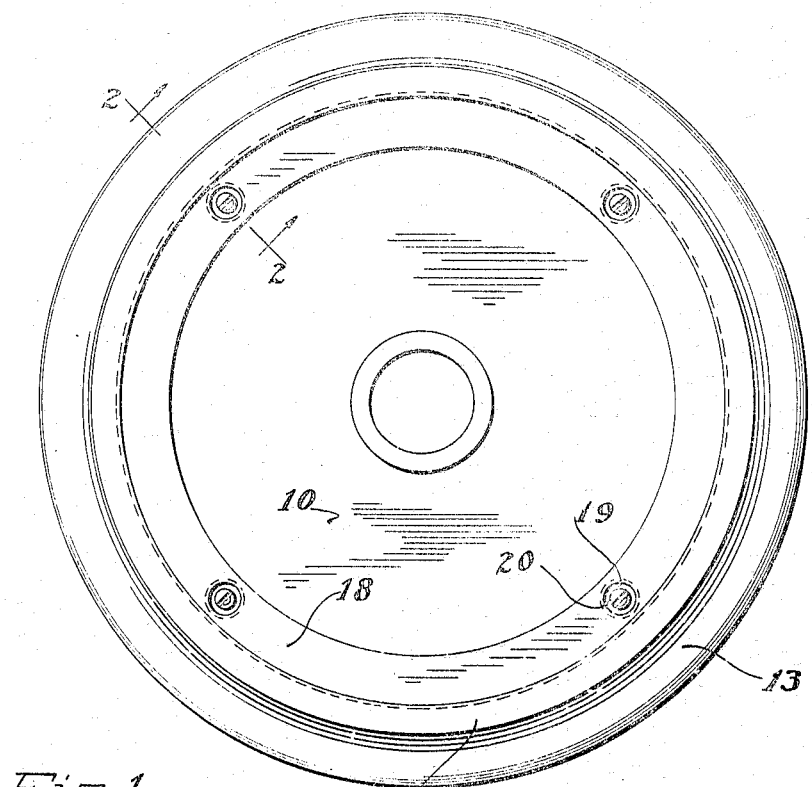
Figure 1 is a side elevation of a brake drum illustrating the invention as applied.
Figure 2:
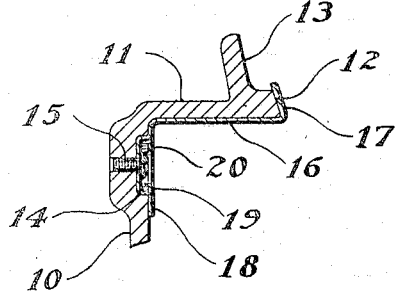
Figure 2 is a sectional view substantially on line 2—2, Figure 1.

Referring to the drawing for more specific details of the invention, 10 represents a brake drum which may be of any conventional type. As shown, the drum 10 has a flange 11, the edge of which is bevelled as indicated at 12 and formed on the periphery of the flange is a web 13 to which a disk, not shown, may be secured. The drum 10 is provided with spaced depressions 14 arranged within the drum upon the head thereof just beneath the flange and these depressions are bored and tapped as indicated at 15, the object of which will hereinafter appear.

A brake drum liner 16 comprising a cylindrical shell having flanges 17 and 18 formed on its respective ends and extending in opposite directions is fitted snugly in the drum to provide a suitable engaging surface for a friction element, not shown. The flange 17 of the liner is bent backwardly to conform with the bevelled edge of the drum 12 and the flange 18 is swaged to provide cups or pockets 19 adapted to fit snugly within the depressions 14 and screws 20 passing through these cups are threaded into the head.

It will be observed that by reason of the flange 17, the liner may be effectively secured to the drum. The flange is secured against the edge 12 on the flange 11 because of tension imposed on the liner between the edge 12 and the securing means 20. Relative rotation between the drum and the liner is prevented by reason of the cups 19 on the liner in the depressions 14 in the head of the drum. Since the cups 19 fit snugly in the depressions 14, all stress and strain on the retaining screws 20 is eliminated.

Figure 3:
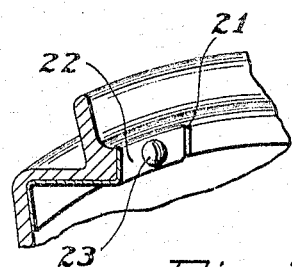
Figure 3 illustrates a modification.

In Figure 3, I have illustrated a modification of the invention wherein the flange on the drum is notched as indicated at 21 to receive lugs or ears 22 formed on the liner and bent radially thereto, so that any tendency toward a relative rotation between the drum and the liner is effectively eliminated. In this embodiment of the invention, the liner is shrunk in position on the flange of the drum with the lugs 22 positioned in the notches 21 and screws 23 passing through the lugs are threaded into the flange of the drum. The screws prevent lateral movement of the liner.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake drum comprising a head and a flange, a liner for the flange, said liner provided with a flange portion adapted to contact said head and interlocking means between the drum and the liner, said means comprising interfitting portions on said liner and brake drum head.

2. A brake drum liner comprising a cylindrical member having oppositely disposed flanges, one of which is bent back to provide a socket and the other is provided with cups for the reception of securing members.

3. A brake drum comprising a head and a flange, a liner for the flange having a socket receiving the edge of the flange and a dependent flange having cups adapted to receive securing members.

4. A brake drum comprising a head and a flange, a liner for the flange having a socket receiving the edge of the flange and a dependent flange on the liner having pockets adapted to receive securing members.

5. A brake drum comprising a head having depressions and a rim having a bevelled edge, a liner for the rim having a socket receiving the bevelled edge of the rim and cups fitting snugly in the depressions.

6. A brake comprising a head having a plurality of depressions and a rim having a bevelled edge, a liner fitted in the drum having a flange bent back to receive the bevelled edge on the rim, a flange on the liner having cups fitting snugly in the depressions on the head and means in the cups securing the liner against lateral movement.

7. A brake drum comprising a head having spaced depressions and a flange having a bevelled edge, a liner for the flange having flanges on its respective edges arranged in oppositely disposed relation, one of the flanges on the liner being bent back to provide a socket for the bevelled edge and the other provided with cups fitting snugly in the depression on the head and means in the cups securing the liner to the head.

In testimony whereof, I have hereunto signed my name.

FREDERICK C. FRANK.